May 26, 1931.  E. GHIA  1,807,522
TREAD MEMBER FOR TIRE CHAINS
Filed Jan. 13, 1928
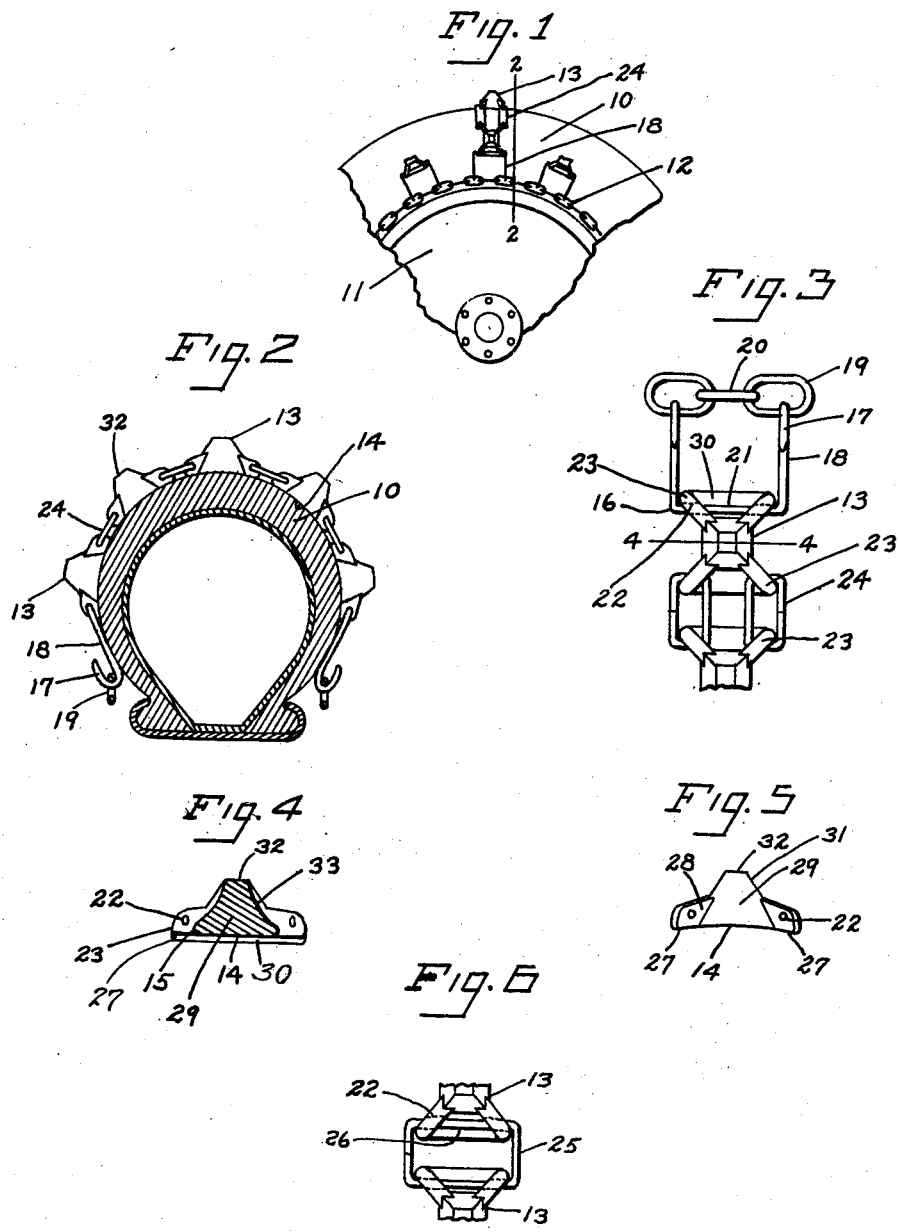

Patented May 26, 1931

1,807,522

UNITED STATES PATENT OFFICE

EUGENE GHIA, OF BRISTOL, CONNECTICUT

TREAD MEMBER FOR TIRE CHAINS

Application filed January 13, 1928. Serial No. 246,500.

My invention relates to improvements in tread members for tire chains of the form that is connected across between two side chains on an automobile wheel, and the object of my improvement is to produce a tread member that is composed of a series of spurs that are connected together by means of links that engage with the corners of the spurs so as to serve to hold the spurs generally in the proper position for effective engagement with the roadbed; in which the links are shielded from contact with the tire; in which only a relatively plain and smooth contacting face is provided for the spurs in their engagement with the face of the tire; the spur being of relatively substantial and massive construction so as to provide for long life and wear; and, finally, in which as to the details of the spur, the exposed faces and corners are constructed and arranged for effectively gripping the roadbed.

In the accompanying drawing:—

Figure 1 is a side elevation of part of an automobile wheel that is equipped with an antiskidding device that has tread members in accordance with my invention.

Figure 2 is a sectional view on an enlarged scale on the line 2—2 of Fig. 1.

Figure 3 is a plan view of part of the end portion of one of the tread members and a few of the adjacent spurs.

Figure 4 is a sectional view of one of the spurs on the line 4—4 of Fig. 3.

Figure 5 is a side view of one of the spurs.

Figure 6 is a plan view corresponding to Fig. 3 of a modification of the detail of the link connection.

My improved tread member for tire chains is connected across the outer face of a tire 10 of an automobile wheel 11 with the ends connected to the side chains 12 at the side of said wheel.

The tread member is built up of a series of spurs 13 that have a relatively large and plain under face 14 for making contact with the outer face of the tire 10 and the side edges 15 of said contacting face are slightly rounded so that there are no sharp corners or the like that make contact with the tire 10.

Said spurs 13, therefore, under operating conditions, and in order to obtain proper results, are held in a generally definite position by link devices that engage with the corners and at the ends make a two-point connection with the side chains.

Thus the end spur 13 may, as shown, be connected by means of a U-shaped link 16 that has two hooks 17 respectively at the ends of the two arms 18 for making separate engagement with laterally spaced links 19 of the side chains 12, and which side chain links 19 are inter-connected by means of an intermediate link 20. The yoke 21 of said U-shaped link 16 is in the form of a bar that is threaded through the two openings 22 at the corners 23 of the end spur 13.

Beyond the ends and extending from one end portion to the other the spurs 13 may be connected in series by links that engage with the corners 23. Such connecting links may be in the form of individual links 24 for connecting the opposed and adjacent corners 23, or, as shown in the modification, a single link 25 may be used between adjacent spurs 13. Said single links 25 are shaped to provide bar-like elements 26 that are threaded through the corner holes 22.

The spurs 13 serve as the active holding members in the engagement with the roadway. The under face 14, as mentioned, is relatively large, plain, and smooth for contacting with the face of the tire and also said face 14 is curved in the longitudinal direction, between the ends 27.

The corners 23 that have the holes 22 for the connecting links have integral lugs 28 that project outwardly at an angle of forty-five degrees with the general structure of the spur body 29 and the holes 22 are provided in said lugs 28. Said corner lugs 28 merge with a platform 30 at the ends and extending across the space between said corner lugs 28 at the ends of the spur structure. The under faces of the platforms 30 merge with the under face of the body 29 and co-operate therewith to provide the relatively extended bottom contacting face 14 already mentioned.

The spur body 29 is generally pyramidal in shape and of square or rectangular form of cross-section, the top being truncated so as to provide the substantially flat top face 32, and which makes direct contact with the roadway.

The pyramidal form applies substantially correctly for the form provided by the four corner edges 31. Intermediate said corner edges 31, however, the side faces 33 are depressed in curved form or concave. This detail serves to ensure good sharp corner edges 31 and also tends to maintain this condition throughout the life of the spur as it wears down under conditions of use.

The spur, as described, is adapted to be made by drop forging.

The corners, edges, or corner lines 31 that define the outline of the spur cooperate to define a skeleton pyramidal structure, the faces between adjacent corners being individually depressed in continued and unbroken concave form.

I claim as my invention:—

1. A spur member for use in an anti-skidding device comprising a spur proper of four-sided pyramidal form, rib-like lugs radiating from the corners of said spur and perforated individually for connecting means, a web-like platform connecting said lugs in pairs at opposite ends of said spur, the bottoms of said lugs, platforms, and spur merging in a continuous contact face for seating on a tire and having the form of fan-like projections at said opposite ends and interrupted at the sides by approximately V-shaped spaces between the lugs on each side, said lugs being of appreciable length relatively to said spur and the perforations being adjacent the ends of said lugs.

2. In a spur member as described in claim 1, said perforations being directed in alignment in pairs so that a single straight bar of a connecting device can be housed in the perforations of each of said pairs.

3. A spur structure for use in a tread member of an anti-skidding device comprising a spur proper in the form of a relatively massive central body, lugs in the form of rib-like ridges radiating at substantially ninety degree intervals from said body and having the end portions perforated for connecting means, the under faces of said body and lugs merging as a contacting seat for seating on a tire, and the said seat being provided on the opposite sides with open recess-like spaces that are each defined by two of the lugs on one side of the said body intermediate the inner ends thereof.

4. In a tread member for an anti-skidding device, a spur member for use in connecting in straight-line series with other similar spur members, having at each end a pair of laterally spaced rib-like lugs and a spur proper intermediate said pairs, and the members of each of said pairs being individually perforated along a line transverse to the line of the series so as to be adapted for individual connection with an opposed lug of an adjacent spur member and providing a double laterally spaced connection structure from spur member to spur member.

EUGENE GHIA.